(12) United States Patent
Gan et al.

(10) Patent No.: US 11,308,029 B2
(45) Date of Patent: Apr. 19, 2022

(54) FILE SAVING METHOD AND ELECTRONIC DEVICE

(71) Applicant: Huawei Technologies Co., Ltd., Shenzhen (CN)

(72) Inventors: Yuanli Gan, Shenzhen (CN); Huaqi Hao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 706 days.

(21) Appl. No.: 16/097,040

(22) PCT Filed: Apr. 28, 2016

(86) PCT No.: PCT/CN2016/080457
§ 371 (c)(1),
(2) Date: Oct. 26, 2018

(87) PCT Pub. No.: WO2017/185277
PCT Pub. Date: Nov. 2, 2017

(65) Prior Publication Data
US 2019/0087433 A1   Mar. 21, 2019

(51) Int. Cl.
*G06F 16/00* (2019.01)
*G06F 16/13* (2019.01)
*G06F 16/58* (2019.01)
*G06F 16/95* (2019.01)
*G06F 16/14* (2019.01)
*G06F 16/9535* (2019.01)
*G06F 16/41* (2019.01)

(52) U.S. Cl.
CPC .............. *G06F 16/13* (2019.01); *G06F 16/00* (2019.01); *G06F 16/148* (2019.01); *G06F 16/41* (2019.01); *G06F 16/58* (2019.01); *G06F 16/95* (2019.01); *G06F 16/9535* (2019.01)

(58) Field of Classification Search
CPC ........ G06F 16/13; G06F 16/95; G06F 16/148; G06F 16/58; G06F 16/9535; G06F 16/41
USPC .................................................. 707/754, 693
See application file for complete search history.

(56) References Cited

U.S. PATENT DOCUMENTS

| | | | |
|---|---|---|---|
| 2008/0091749 A1* | 4/2008 | Kitamaru | G06F 16/58 |
| 2008/0133445 A1 | 6/2008 | Pennington | |
| 2009/0199093 A1 | 8/2009 | Chakravarty | |
| 2010/0198798 A1 | 8/2010 | Doehla et al. | |
| 2011/0167109 A1 | 7/2011 | Papchenko et al. | |
| 2012/0213421 A1 | 8/2012 | Chien | |
| 2013/0103742 A1* | 4/2013 | Hsi | H04N 1/00159 709/203 |

(Continued)

FOREIGN PATENT DOCUMENTS

| | | |
|---|---|---|
| CN | 101334780 A | 12/2008 |
| CN | 102760070 A | 10/2012 |

(Continued)

*Primary Examiner* — Chelcie L Daye
(74) *Attorney, Agent, or Firm* — Slater Matsil, LLP

(57) ABSTRACT

A file saving method and an electronic device are provided. The file saving method includes: obtaining at least one to-be-processed file in a social circle, where the to-be-processed file is a file uploaded by another user in the social circle other than a user of the electronic device; filtering the at least one to-be-processed file according to a preset rule, to obtain a target file that complies with the preset rule; and saving the target file.

13 Claims, 3 Drawing Sheets

(56) References Cited

U.S. PATENT DOCUMENTS

| | | | |
|---|---|---|---|
| 2013/0166656 A1* | 6/2013 | Taub | G06Q 50/01 709/206 |
| 2013/0238574 A1 | 9/2013 | Kim | |
| 2014/0006420 A1* | 1/2014 | Sparrow | G06F 16/435 707/748 |
| 2014/0181089 A1 | 6/2014 | Desmond et al. | |
| 2015/0082386 A1 | 3/2015 | Safa | |
| 2016/0105486 A1 | 4/2016 | Lee | |

FOREIGN PATENT DOCUMENTS

| | | |
|---|---|---|
| CN | 102833266 A | 12/2012 |
| CN | 102982064 A | 3/2013 |
| CN | 103064891 A | 4/2013 |
| CN | 103838732 A | 6/2014 |
| CN | 104268267 A | 1/2015 |
| CN | 104317932 A | 1/2015 |
| CN | 104376121 A | 2/2015 |
| CN | 105022819 A | 11/2015 |
| CN | 105303396 A | 2/2016 |
| CN | 105354282 A | 2/2016 |
| JP | 2007334696 A | 12/2007 |
| JP | 2008299753 A | 12/2008 |
| JP | 2012216082 A | 11/2012 |
| JP | 2014500536 A | 1/2014 |
| KR | 20150016980 A | 2/2015 |
| RU | 2378685 C2 | 1/2010 |
| RU | 2447506 C2 | 4/2012 |
| RU | 2486679 C2 | 6/2013 |

* cited by examiner

FILE SAVING METHOD AND ELECTRONIC DEVICE

CROSS-REFERENCE TO RELATED APPLICATIONS

This application is a national stage of International Application No. PCT/CN2016/080457, filed on Apr. 28, 2016, which is hereby incorporated by reference in its entirety.

TECHNICAL FIELD

The present invention relates to the field of multimedia processing technologies, and in particular, to a file saving method and an electronic device.

BACKGROUND

As Internet technologies develop, users participate in social activities in a social circle, for example, have a chat in the social circle and share files in the social circle. When a user shares a file (for example, a multimedia file) in a social circle, another user may choose to download or collect the file. For example, a user selects a photo or a batch of photos, and taps a "share" button, to share the batch of photos in the social circle. Another user can view photos shared by others, and find a photo of the user and download or collect the photo.

Today, with a huge amount of information, files are used in a wide range of scenarios. Users need to actively filter uploaded files, to complete collection and saving operations. Apparently, these operations are quite time-consuming and inefficient.

SUMMARY

Embodiments of the present invention provide a file saving method and an electronic device, to automatically filter a file, thereby saving time for a user and improving efficiency.

A first aspect of the present invention provides a file saving method, applied to an electronic device, and including: obtaining at least one to-be-processed file in a social circle, where the to-be-processed file is a file uploaded by another user in the social circle other than a user of the electronic device, and the to-be-processed file may include an image, music, a video, a Word document, an Excel file, a PPT file, a PDF file, and the like; filtering the at least one to-be-processed file according to a preset rule, to obtain a target file that complies with the preset rule, where the preset rule may be performing matching between a preset keyword and a parsed to-be-processed file, or may be an image matching rule, for example, performing matching between a head portrait of the user of the electronic device and the parsed to-be-processed file, or may be performing matching between a comment keyword of the user of the electronic device on the to-be-processed file and the parsed to-be-processed file; and saving the target file. In this manner, the at least one to-be-processed file uploaded by the another user can be automatically filtered according to the preset rule, thereby selecting a file that meets a requirement of the user. This saves time for the user, and improves efficiency.

Based on the first aspect, in a first possible implementation of the first aspect, the foregoing preset rule includes at least one of a preset keyword matching rule, an image matching rule, or a comment keyword matching rule of the user of the electronic device for the to-be-processed file. In this manner, the user may customize the preset rule, so as to select the file that meets the requirement of the user. This saves the time for the user.

Based on the first possible implementation of the first aspect, in a second possible implementation of the first aspect, before the filtering the at least one to-be-processed file according to a preset rule, the method further includes: parsing the at least one to-be-processed file, to obtain a feature library corresponding to each to-be-processed file, where the feature library includes a plurality of elements that are used to represent feature of the to-be-processed file, one to-be-processed file is corresponding to one feature library, and all the elements in the feature library are used to describe the to-be-processed file (for example, macro may be a feature element of a picture); and the filtering the at least one to-be-processed file according to a preset rule includes: filtering, according to the preset rule, the feature library corresponding to each to-be-processed file in the at least one to-be-processed file. The feature library corresponding to each to-be-processed file is filtered according to the preset rule, so as to select the file that meets the requirement of the user.

Based on the second possible implementation of the first aspect, in a third possible implementation of the first aspect, if the preset rule includes the preset keyword matching rule, and the preset keyword includes a keyword specified by the user of the electronic device (for example, a keyword added by the user of the electronic device) or a default keyword in the electronic device, the filtering, according to the preset rule, the feature library corresponding to each to-be-processed file in the at least one to-be-processed file, to obtain a target file that complies with the preset rule includes: performing matching between the preset keyword and the elements in the feature library corresponding to each to-be-processed file in the at least one to-be-processed file, and determining a to-be-processed file corresponding to a matched element as the target file that complies with the preset rule. Matching is performed between the preset keyword and the elements in the feature library of each to-be-processed file. If there is an element, in a feature library of a to-be-processed file, matching the preset keyword, the to-be-processed file is determined as the target file that complies with the preset rule. If the preset keyword is macro, and the feature element macro exists in a feature library of a to-be-processed file, the to-be-processed file is determined as the target file. The user may set a preset keyword, to easily and quickly find a file that meets a requirement.

Based on the second possible implementation of the first aspect, in a fourth possible implementation of the first aspect, if the preset rule includes the comment keyword matching rule of the user of the electronic device for the to-be-processed file, the filtering, according to the preset rule, the feature library corresponding to each to-be-processed file in the at least one to-be-processed file, to obtain a target file that complies with the preset rule includes: obtaining comment content of the user of the electronic device on the to-be-processed file, and extracting, from the comment content, a target keyword that meets a preset condition, where the target keyword that meets the preset condition may include a word that can represent an emotional tendency of the user and a word that can represent a feature of the to-be-processed file; and performing matching between the target keyword and the elements in the feature library corresponding to each to-be-processed file in the at least one to-be-processed file, and determining a to-be-processed file corresponding to a matched element as the target file that complies with the preset rule. In this manner, the comment keyword of the user on the to-be-processed file is obtained, so that the emotional tendency of the user is found, and the file that meets the requirement of the user is selected.

Based on the first aspect or the first possible implementation of the first aspect, in a fifth possible implementation of the first aspect, before the saving the target file, the method further includes: determining whether a file that is the same as the target file exists in the electronic device, where the file that is the same as the target file may be a file that has at least one of a same file name, same time, or same file content; and the saving the target file includes: if the file that is the same as the target file does not exist in the electronic device, saving the target file to the electronic device. In this manner, before the target file is saved, whether the same file exists in the electronic device is first determined, so as to achieve an effect of automatic deduplication by the electronic device.

Based on the first aspect or the first possible implementation of the first aspect, in a sixth possible implementation of the first aspect, before the saving the target file, the method further includes: determining whether a file that is the same as the target file exists in a preset cloud, where the file that is the same as the target file may be a file that has at least one of a same file name, same time, or same file content; and the saving the target file includes: if the file that is the same as the target file does not exist in the preset cloud, saving the target file to the preset cloud, where the preset cloud may be a cloud file set that is preset by the user (for example, a cloud disk of the user of the electronic device). In this manner, an automatically selected file may be saved to the cloud, so that memory occupied in the electronic device is reduced.

A second aspect of the present invention discloses an electronic device, where the electronic device includes a functional module that is configured to perform some or all steps of any method in the first aspect of the embodiments of the present invention. When performing some or all the steps of any method in the first aspect, the electronic device may automatically filter, according to a preset rule, at least one to-be-processed file uploaded by a user other than a user of the electronic device, thereby selecting a file that meets a requirement of the user. This saves time for the user, and improves efficiency.

A third aspect of the present invention discloses an electronic device. The electronic device includes a processor, a memory, and a bus. The memory is configured to store an execution instruction, the processor and the memory are connected by using the bus, and when the electronic device runs, the processor executes the execution instruction stored in the memory, so that the electronic device performs some or all the steps of any method in the first aspect. When performing some or all the steps of any method in the first aspect, the electronic device may automatically filter, according to a preset rule, at least one to-be-processed file uploaded by a user other than a user of the electronic device, thereby selecting a file that meets a requirement of the user. This saves time for the user, and improves efficiency.

A fourth aspect of the present invention provides a computer-readable storage medium, where the computer storage medium stores a program, and the program specifically includes an instruction for performing some or all steps of any method in the first aspect of the embodiments of the present invention.

In the embodiments of the present invention, the at least one to-be-processed file in the social circle is obtained, and the to-be-processed file is a file uploaded by the another user in the social circle other than the user of the electronic device; the at least one to-be-processed file is filtered according to the preset rule, to obtain the target file that complies with the preset rule; and the target file is saved. In this manner, the at least one to-be-processed file uploaded by the another user can be automatically filtered according to the preset rule, thereby selecting a file that meets a requirement of the user. This saves time for the user, and improves efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the term "include" and any other variants of the term mean to cover the non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the embodiments of the present invention, an electronic device may be a terminal having a multimedia processing function. The terminal may include but is not limited to the following various user terminals: a smartphone, a notebook computer, a personal computer (PC), a personal digital assistant (PDA), a mobile Internet device (MID), and an intelligent wearable device (such as a smartwatch or a smart band). Alternatively, the electronic device may be a server having a multimedia processing function.

In the embodiments of the present invention, a to-be-processed file includes but is not limited to a multimedia file, a Word document, an Excel file, a PPT file, and a PDF file, and is not limited herein.

Figure 1:
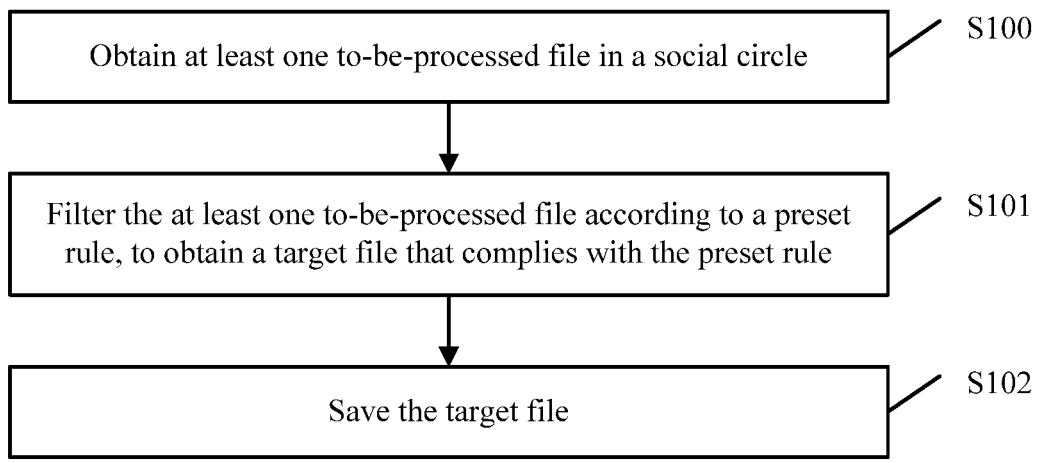
FIG. 1 is a schematic flowchart of a multimedia file saving method according to an embodiment of the present invention.

Referring to FIG. 1, FIG. 1 is a schematic flowchart of a multimedia file saving method disclosed in an embodiment of the present invention. The multimedia file saving method is applied to an electronic device. As shown in FIG. 1, the method may include the following steps.

S100. Obtain at least one to-be-processed file in a social circle, where the to-be-processed file is a file that is uploaded by another user in the social circle other than a user of the electronic device and that is not processed by the electronic device. That the to-be-processed file is not processed by the electronic device may be that the to-be-processed file is not opened on the electronic device, that the to-be-processed file is not browsed on the electronic device, that the to-be-processed file is not saved to the electronic device, that the to-be-processed file is not downloaded or commented, or any combination thereof, which may be selected and determined by a user voluntarily.

In this embodiment of the present invention, the social circle may include an online social circle established by using a social networking service (SNS) or an instant messaging server, such as a microblog circle, an online game circle, a book club circle, a circle of tour pals, a circle of friends, or a chat group. A social circle user is an authorized user belonging to a social circle, and all authorized users of the social circle are users who are approved to have a common specified attribute. The social circle may be a school, a class, a life circle, an interest group, or the like, and is not limited in this embodiment of the present invention. For example, when the social circle is a school, all authorized users in an alumni record have a common attribute of the school by default.

A user may perform a social activity in the social circle, for example, perform chatting in the social circle, and share files in the social circle. After a user shares and uploads a file to the social circle, all other users may comment on, download, and collect and save the file.

In this embodiment of the present invention, the to-be-processed file includes but is not limited to a picture, a video, music, a Word document, an Excel file, a PPT file, and a PDF file, and is not limited in the present invention. The user of the electronic device is a user who logs in to the social circle on the electronic device by using a communication account of the user.

The at least one to-be-processed file in the social circle is obtained, and the to-be-processed file is a file uploaded by the another user in the social circle other than the user of the electronic device. It should be noted that the to-be-processed file may be alternatively a file shared by the another user.

Slot Filter the at least one to-be-processed file according to a preset rule, to obtain a target file that complies with the preset rule.

In this embodiment of the present invention, the at least one to-be-processed file is filtered according to the preset rule, to obtain the target file that complies with the preset rule. Optionally, the preset rule may be set by the user according to a requirement of the user. The preset rule may include at least one of a preset keyword matching rule, an image matching rule, or a comment keyword matching rule of the user of the electronic device or a user of another electronic device for the multimedia file.

It should be noted that a preset keyword may be a keyword that is set by the user according to a preference or an interest of the user, or may be a keyword of interest selected by the user from a keyword selection library that is provided by a system. For the image matching rule, recognition and matching may be performed by using an image recognition technology.

For example, if the to-be-processed file is a picture file, and a user wants to select, from a picture file uploaded by another user, a picture that includes a head portrait of the user, the user may filter the picture file according to the image matching rule, to obtain the picture that includes the head portrait of the user. Alternatively, when the user wants to select, from the picture file uploaded by the another user, a picture that includes an animal, the user may filter the picture file according to an image recognition and matching rule, to obtain the picture that includes the animal. The user performs matching between a preset picture and a to-be-processed picture, and the preset picture is the picture that includes the animal.

For another example, if a multimedia file is a picture file, and a user likes landscape pictures, the user may filter the picture file according to the keyword matching rule. The user parses, by using an image recognition technology, the picture file uploaded by another user, and performs matching between a preset keyword "landscape" and a parsed picture, or certainly, may filter the picture file according to the image recognition and matching rule, and perform matching between a preset picture and a to-be-processed image. The preset image is a picture that includes landscape.

Alternatively, if the multimedia file is a picture file, comment content of the user of the electronic device on the picture file may be obtained, and a keyword that meets a preset condition, such as "like" or "landscape", may be extracted from the comment content, and then matching is performed between the keyword "landscape" and a parsed picture, so as to learn an emotional tendency of the user of the electronic device on the picture file.

It should be noted that the to-be-processed file includes but is not limited to the picture files in the foregoing examples, and may be a video file, a music file, or some non-multimedia files (such as a Word document, an Excel file, a PPT file, or a PDF file).

When another user uploads a plurality of pieces of music, the plurality of pieces of music may be filtered according to the preset rule, to select music that complies with the preset rule. For example, if the user of the electronic device likes music of soft and slow rhythms, the user may parse the plurality of pieces of music, to obtain a feature element of each piece of music, and then perform matching between a preset keyword "soft and slow" and a parsed music feature element, to obtain the music of soft and slow rhythms.

For another example, the to-be-processed file is some non-multimedia files, a file name of the to-be-processed file and/or words in file content may be parsed, and then matching is performed between a preset keyword and the parsed file name and/or the parsed words in the file content, to obtain the target file that complies with the preset rule. Alternatively, matching is performed between a comment keyword of the user and the parsed file name and/or the parsed words in the file content, to obtain the target file that complies with the preset rule.

S102. Save the target file.

In this embodiment of the present invention, the target file obtained by filtering (including a target multimedia file and/or non-multimedia file) is saved. The target file may be saved in a plurality of manners, for example, may be locally saved to the electronic device, or may be saved to a preset cloud. The target file includes but is not limited to a picture, music, and a video.

Optionally, two optional implementations of manners of saving the target file are as follows.

In a first optional implementation, before the target file is saved, the method further includes the following step S10.

S10. Determine whether a file that is the same as the target file exists in the electronic device.

In this embodiment of the present invention, a specific manner of determining whether the file that is the same as the target file exists in the electronic device may include but is not limited to: determining whether a file in the electronic device is the same as the target file according to at least one of a file name, a time, or file content of the file. In this determining manner, an effect of automatic deduplication can be achieved. It should be noted that the content of the file can be obtained only by parsing the file.

The saving the target file includes: if the file that is the same as the target file does not exist in the electronic device, saving the target file to the electronic device.

In this embodiment of the present invention, if the file that is the same as the target file does not exist in the electronic device, the target file is saved to the electronic device. Optionally, the user of the electronic device may set a saving path of the target file in the electronic device.

In a second optional implementation, before the target file is saved, the method further includes the following step S11.

S11. Determine whether a file that is the same as the target file exists in a preset cloud.

In this embodiment of the present invention, the preset cloud may be a cloud storage location preset by the user, for example, may be a cloud file set corresponding to the user of the electronic device, for example, a cloud disk corresponding to an account of the user of the electronic device; or may be an album corresponding to an instant messaging account of the user of the electronic device.

Before the target file is saved to the preset cloud, whether the file that is the same as the target file exists in the preset cloud also needs to be determined. A specific determining manner may include but is not limited to: determining whether a file in the preset cloud is the same as the target file according to at least one of a file name, a time, or file content of the file. In this determining manner, an effect of automatic deduplication can be achieved. It should be noted that the content of the file can be obtained only by parsing the file.

The saving the target file includes: if the file that is the same as the target file does not exist in the preset cloud, saving the target file to the preset cloud.

In this embodiment of the present invention, if the file that is the same as the target file does not exist in the preset cloud, the target file is saved to the preset cloud. Optionally, the user of the electronic device may set a saving path of the target file in the preset cloud.

In this embodiment of the present invention, the at least one multimedia file in the social circle is obtained, and the multimedia file is a file uploaded by the another user in the social circle other than the user of the electronic device; the at least one multimedia file is filtered according to the preset rule, to obtain the target multimedia file that complies with the preset rule; and the target multimedia file is saved. In this manner, the at least one multimedia file uploaded by the another user can be automatically filtered according to the preset rule, thereby selecting a multimedia file that meets a requirement of the user. This saves time for the user, and improves efficiency.

Figure 2:
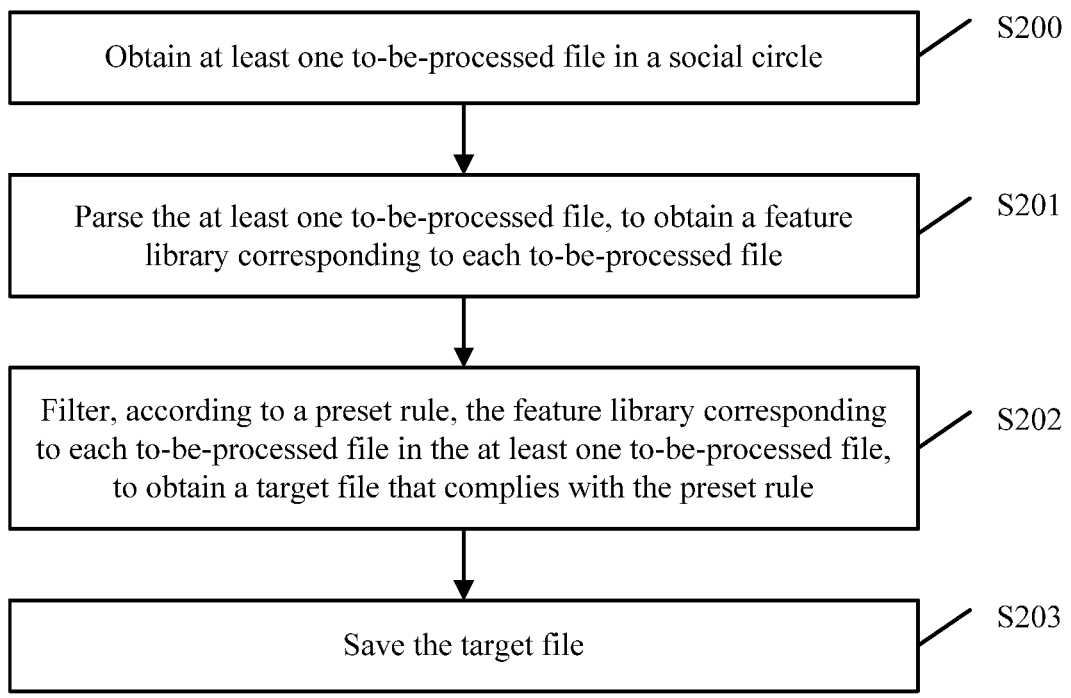
FIG. 2 is a schematic flowchart of another multimedia file saving method according to an embodiment of the present invention.

Referring to FIG. 2, FIG. 2 is a schematic flowchart of another multimedia file saving method according to an embodiment of the present invention. As shown in the figure, the multimedia file saving method in this embodiment includes the following steps.

S200. Obtain at least one to-be-processed file published in a social circle, where the to-be-processed file is a file uploaded by another user in the social circle other than a user of the electronic device.

For step S200 in this embodiment of the present invention, refer to step S100 in the embodiment in FIG. 1, and details are not described herein again.

S201. Parse the at least one to-be-processed file, to obtain a feature library corresponding to each to-be-processed file, where the feature library includes a plurality of elements that are used to represent feature of the to-be-processed file.

In this embodiment of the present invention, after the at least one to-be-processed file in the social circle is obtained, the to-be-processed file further needs to be parsed, to obtain the feature library corresponding to each to-be-processed file. A specific parsing manner may be: parsing content of the to-be-processed file and/or parsing a file name of the to-be-processed file, to obtain the plurality of elements that are used to represent the feature of the to-be-processed file. The feature of the to-be-processed file may include an attribute feature of the to-be-processed file.

For example, if the to-be-processed file is a picture, content of the picture may be parsed by using an image recognition technology, to obtain a plurality of elements that are used to represent features of the picture. The plurality of elements that are used to represent the features of the picture include but are not limited to the content, colors, and an attribute feature of the picture. The attribute feature may include but is not limited to a size of the picture and an encoding scheme of the picture.

If the picture is a macro picture, content of the picture may be parsed to obtain a feature element of the macro picture. If the picture includes a face, feature elements such as an element indicating a front face or an element indicating a side face may further be obtained by parsing the content of the picture.

Optionally, an element that is used to represent the content of the picture file may be obtained by parsing the content of the picture file. For example, if the picture includes a scenery, a feature element of the picture includes an element "scenery". For another example, if the picture includes a face, a feature element of the face may further be obtained. The feature element includes a facial feature element.

Further, optionally, words added to the picture may further be parsed, to obtain a word element of the multimedia. For example, a photographing date is printed on a picture, and the date may also be used as a feature element of the picture.

Optionally, the to-be-processed file is audio or a video. Likewise, the to-be-processed file may be parsed, to obtain a feature library that is used to represent features of the multimedia file. For example, if the to-be-processed file is audio, an element in the feature library may include but is not limited to audio content, audio frequency, and audio duration.

It may be understood that the to-be-processed file may be alternatively some non-multimedia files, such as a Word document, an Excel file, a PPT file, or a PDF file. In this case, an element in a feature library obtained by parsing the non-multimedia file may include but is not limited to a file name and/or content of the file.

S202. Filter, according to a preset rule, the feature library corresponding to each to-be-processed file in the at least one to-be-processed file, to obtain a target file that complies with the preset rule.

In this embodiment of the present invention, the feature library corresponding to each to-be-processed file in the at least one to-be-processed file is filtered according to the preset rule, to obtain the target file that complies with the preset rule. Specifically, optionally, whether the feature library corresponding to each to-be-processed file includes an element that complies with the preset rule is determined according to the preset rule.

For example, the preset rule includes an image matching rule, and the to-be-processed file is a picture. If a user needs to find an image that includes a standard face, the user extracts a feature element of a standard face image that needs to be filtered (for example, the user needs to find a picture of the user from a plurality of pictures, and in this case, the feature element of the standard face image may be a feature element obtained by parsing and recognizing a face image of the user, and includes but is not limited to facial feature elements), and parses a plurality of pictures obtained from a circle of friends, to obtain a feature library corresponding to each picture. The feature library includes a face feature element in the picture, and matching is performed between the standard face feature element and the face feature element in the feature library corresponding to each picture. If the standard face feature element matches the face feature element in the feature library corresponding to each picture, it indicates that the picture includes the standard face, that is, the picture is the target file.

It should be noted that the image matching rule applies not only to face matching, but also to animal picture matching, landscape picture matching, and the like. For example, a picture that includes landscape may be found in a plurality of to-be-processed pictures according to the image matching rule.

Optionally, if the preset rule includes the preset keyword matching rule, and the preset keyword includes a keyword specified by the user of the electronic device or a default keyword in the electronic device, the filtering, according to the preset rule, the feature library corresponding to each to-be-processed file in the at least one to-be-processed file, to obtain a target file that complies with the preset rule includes: performing matching between the preset keyword and the elements in the feature library corresponding to each to-be-processed file in the at least one to-be-processed file, and determining a to-be-processed file corresponding to a matched element as the target file that complies with the preset rule.

In this embodiment of the present invention, the preset rule may include the preset keyword matching rule, and the preset keyword may include the keyword specified by the user of the electronic device. For example, if the user of the electronic device likes pictures that include "landscape", "landscape" may be used as the preset keyword. It should be noted that the user may enter a sentence when specifying the keyword, and a system automatically extracts a keyword in the sentence as the preset keyword.

Optionally, the preset keyword may be alternatively the default keyword in the electronic device, and matching is performed between the preset keyword and the elements in the feature library corresponding to each to-be-processed file in the at least one to-be-processed file. If an element in a feature library corresponding to a to-be-processed file matches the preset keyword, the to-be-processed file is determined as the target file that complies with the preset rule, and the target file is saved.

For example, A, B, and C are in a same social circle, and A shares, with B and C, photos of a travel to Tibet in the social circle. B sets a preset keyword that represents an interest of B, for example, scenery. A scenery photo shared by A is saved to a cloud or an electronic device of B as the target multimedia file.

For another example, the to-be-processed file is a Word document, an Excel file, a PPT file, or a PDF file. The elements in the feature library corresponding to the to-be-processed file include but are not limited to a file name of each file and/or content of the file, and matching may be performed between the preset keyword and the elements in the feature library of the to-be-processed file. For example, a user needs to find, in a plurality of to-be-processed files, a file that includes a preset keyword "travel". In this case, the user may find, by means of keyword matching, at least one file of a Word document, an Excel file, a PPT file, or a PDF file that includes "travel".

Optionally, if the preset rule includes a comment keyword matching rule of the user of the electronic device for the to-be-processed file, the filtering, according to the preset rule, the feature library corresponding to each to-be-processed file in the at least one to-be-processed file, to obtain a target file that complies with the preset rule includes the two following steps:

Step 1: Obtain comment content of the user of the electronic device on the to-be-processed file, and extract, from the comment content, a target keyword that meets a preset condition.

Step 2: Perform matching between the target keyword and the elements in the feature library corresponding to each to-be-processed file in the at least one to-be-processed file, and determine a to-be-processed file corresponding to a matched element as the target file that complies with the preset rule.

In this embodiment of the present invention, the preset rule may include the comment keyword matching rule of the user of the electronic device for the to-be-processed file, the comment content of the user of the electronic device on the to-be-processed file is obtained, and the target keyword that meets the preset condition is extracted from the comment content.

Optionally, the target keyword that meets the preset condition may be a word following a word that can indicate an emotional tendency of the user. For example, the comment content of the user of the electronic device on the multimedia file is "I like macro photos so much", and "macro" may be used as the target keyword.

Matching is performed between the target keyword and the elements in the feature library corresponding to each to-be-processed file. If an element in a feature library corresponding to a to-be-processed file matches the target keyword, the to-be-processed file is determined as the target file.

For example, A, B, and C are in a same social circle, and A shares, with B and C, photos of a travel to Tibet in the social circle. C comments on the photos shared by A, for example, "I like your macro photos so much". Keywords "like" and "macro" are obtained by analyzing the comment content of C, and macro photos shared by A may be automatically saved to a cloud or an electronic device of C.

For another example, the to-be-processed file is a Word document, an Excel file, a PPT file, or a PDF file. The elements in the feature library corresponding to the to-be-processed file include but are not limited to a file name of each file and/or content of the file. Comment content of a user on the to-be-processed file is "I like the included travelling files so much", and in this case, "travelling" following "like" may be used as the target keyword. Matching is performed between the target keyword and the elements in the feature library of the to-be-processed file to find the target file, and at least one file of a Word document, an Excel word, a PPT file, or a PDF file that includes "travel" is finally found.

S203. Save the target file.

For step S203 in this embodiment of the present invention, refer to step S102 in the embodiment in FIG. 1, and details are not described herein again.

In this embodiment of the present invention, the at least one multimedia file in the social circle is obtained, and the multimedia file is a file uploaded by the another user in the social circle other than the user of the electronic device; the at least one multimedia file is filtered according to the preset rule, to obtain the target multimedia file that complies with the preset rule; and the target multimedia file is saved. In this manner, the at least one multimedia file uploaded by the another user can be automatically filtered according to the preset rule, thereby selecting a multimedia file that meets a requirement of the user. This saves time for the user, and improves efficiency.

It should be noted that the foregoing preset rule may be at least one of the image matching rule, the preset keyword matching rule, or the comment keyword matching rule of the user of the electronic device for the to-be-processed file, and the three rules may be combined at random. For example, the preset rule may be any one of the three rules, or may be a combination of any two rules of the three rules, or the preset rule may be a combination of the three rules. This is not limited in the present invention.

For example, A, B, and C are in a same social circle (for example, a circle of friends). Shared photos of a travel to Tibet in the social circle, and the photos include head portraits of B and C, some scenery photos, and some macro photos.

A system automatically saves a photo that includes the head portrait of B to a cloud of B, and B sets a preset keyword that represents an interest of B, for example, scenery. In this case, the scenery photos shared by A are also saved to the cloud of B.

The system automatically saves a photo that includes the head portrait of C to a cloud of C, and C comments on the photos shared by A, for example, "I like your macro photos so much". Keywords "like" and "macro" are obtained by analyzing the comment content of C, and the macro photos shared by A may be automatically saved to the cloud of C.

Figure 3:
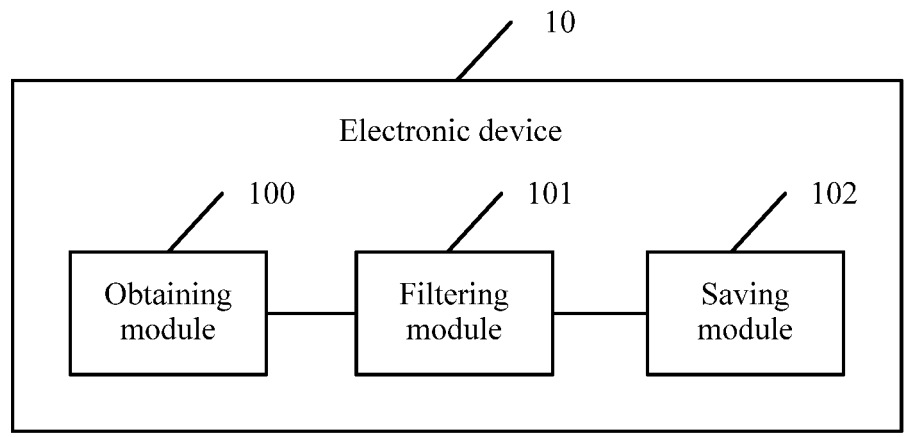
FIG. 3 is a schematic structural diagram of an electronic device according to an embodiment of the present invention.

Referring to FIG. 3, FIG. 3 is a schematic structural diagram of an electronic device according to an embodiment of the present invention. The electronic device in this embodiment includes an obtaining module 100, a filtering module 101, and a saving module 102.

The obtaining module wo is configured to obtain at least one to-be-processed file in a social circle, where the to-be-processed file is a file uploaded by another user in the social circle other than a user of the electronic device.

The filtering module 101 is configured to filter the at least one to-be-processed file according to a preset rule, to obtain a target file that complies with the preset rule.

Optionally, the preset rule includes at least one of a preset keyword matching rule, an image matching rule, or a comment keyword matching rule of the user of the electronic device for the to-be-processed file.

The saving module 102 is configured to save the target file.

In this embodiment of the present invention, the at least one to-be-processed file in the social circle is obtained, and the to-be-processed file is a file uploaded by the another user in the social circle other than the user of the electronic device; the at least one to-be-processed file is filtered according to the preset rule, to obtain the target file that complies with the preset rule; and the target file is saved. In this manner, the at least one to-be-processed file uploaded by the another user can be automatically filtered according to the preset rule, thereby selecting a file that meets a requirement of the user. This saves time for the user, and improves efficiency.

It may be understood that for specific implementations of all the modules in the electronic device, further refer to related description in the method embodiment.

Figure 4:
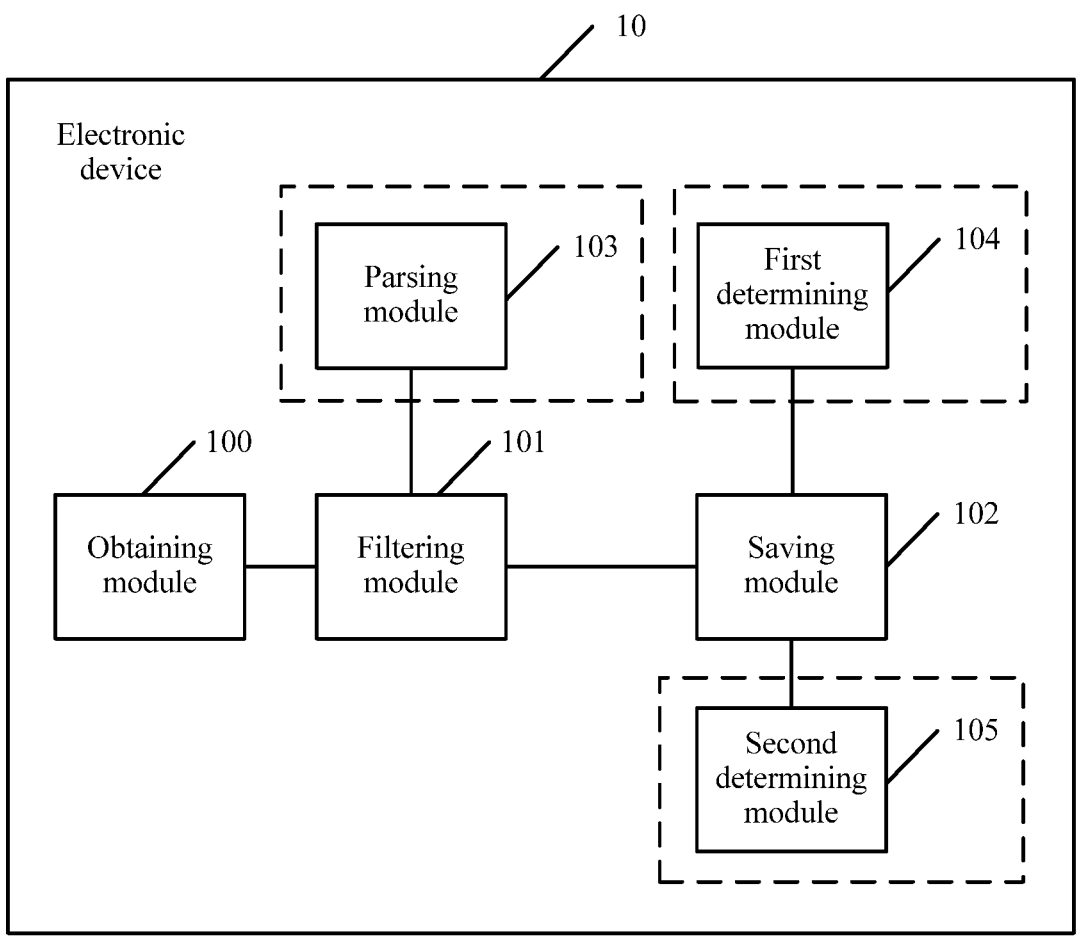
FIG. 4 is a schematic structural diagram of another electronic device according to an embodiment of the present invention.

Referring to FIG. 4, FIG. 4 is a schematic structural diagram of another electronic device according to an embodiment of the present invention. The electronic device shown in FIG. 4 is obtained by further optimizing the electronic device shown in FIG. 3. Compared with the electronic device shown in FIG. 3, in addition to all the modules in the electronic device shown in FIG. 3, the electronic device shown in FIG. 4 may further include: a parsing module 103, configured to parse the at least one to-be-processed file, to obtain a feature library corresponding to each to-be-processed file, where the feature library includes a plurality of elements that are used to represent feature of the to-be-processed file.

The filtering module 101 is specifically configured to filter, according to the preset rule, the feature library corresponding to each to-be-processed file in the at least one to-be-processed file.

Optionally, if the preset rule includes the preset keyword matching rule, and the preset keyword includes a keyword specified by the user of the electronic device or a default keyword in the electronic device, the filtering module 101 is specifically configured to: perform matching between the preset keyword and the elements in the feature library corresponding to each to-be-processed file in the at least one to-be-processed file, and determine a to-be-processed file corresponding to a matched element as the target file that complies with the preset rule.

Optionally, if the preset rule includes the comment keyword matching rule of the user of the electronic device for the to-be-processed file, the filtering module 101 is specifically configured to: obtain comment content of the user of the electronic device on the to-be-processed file, and extract, from the comment content, a target keyword that meets a preset condition; and perform matching between the target keyword and the elements in the feature library corresponding to each to-be-processed file in the at least one to-be-processed file, and determine a to-be-processed file corresponding to a matched element as the target file that complies with the preset rule.

Further, optionally, as shown in FIG. 4, the electronic device may further include a first determining module 104.

The first determining module 104 is configured to determine whether a file that is the same as the target file exists in the electronic device.

The saving module 102 is specifically configured to: if the file that is the same as the target file does not exist in the terminal, save the target file to the electronic device.

Further, optionally, as shown in FIG. 4, the electronic device may further include a second determining module 105.

The second determining module 105 is configured to determine whether a file that is the same as the target file exists in a preset cloud.

The saving module 102 is specifically configured to: if the file that is the same as the target file does not exist in the preset cloud, save the target file to the preset cloud.

In this embodiment of the present invention, the at least one to-be-processed file in the social circle is obtained, and the to-be-processed file is a file uploaded by the another user in the social circle other than the user of the electronic device; the at least one to-be-processed file is filtered according to the preset rule, to obtain the target file that complies with the preset rule; and the target file is saved. In this manner, the at least one to-be-processed file uploaded by the another user can be automatically filtered according to the preset rule, thereby selecting a file that meets a requirement of the user. This saves time for the user, and improves efficiency.

It may be understood that for specific implementations of all the modules in the electronic device, further refer to related description in the method embodiment.

Figure 5:
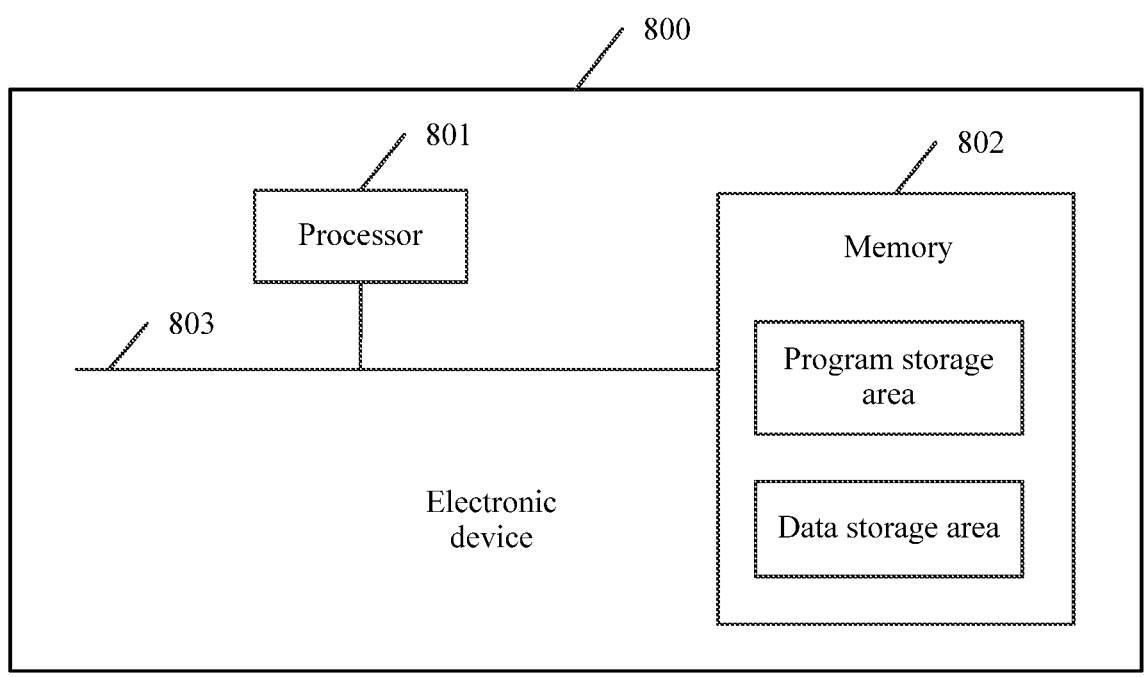
FIG. 5 is a schematic structural diagram of still another electronic device according to an embodiment of the present invention.

Referring to FIG. 5, FIG. 5 is a schematic structural diagram of still another electronic device according to an embodiment of the present invention. The electronic device shown in FIG. 5 is configured to perform a file saving method disclosed in embodiments of the present invention. As shown in FIG. 5, the electronic device 800 may include: at least one processor 801, for example, a CPU (Central Processing Unit), a memory 802, and a communications bus 803. A person skilled in the art may understand that a structure of the electronic device 800 shown in FIG. 5 does not constitute a limitation on the present invention. The structure may be a bus structure, or a star structure; or may include components more or fewer than those shown in FIG. 5, for example, a communications component, configured to implement functions such as communicating with another electronic device and accessing a network, or a locating component, configured to obtain map information and provide a service such as navigation for a user; or may combine some components; or may have different component arrangements.

The memory 802 is configured to store a software program and a module. The processor 801 performs various function applications of a user terminal and implements data processing by running the software program and the module that are stored in the memory 802. The memory 802 mainly includes a program storage area and a data storage area. The program storage area may store an operating system, and an application program required by at least one function, for example, a sound playing program or an image playing program. The data storage area may store data (such as audio data or a phone book) created according to use of the electronic device, and the like. In a specific implementation of the present invention, the memory 802 may include a volatile memory, such as a nonvolatile random access memory (Nonvolatile Random Access Memory, NVRAM), a phase change random access memory (Phase Change RAM, PRAM), or a magnetoresistive random access memory (Magnetoresistive RAM, MRAM), and may further include a nonvolatile memory, such as at least one magnetic disk storage component, an Electrically Erasable Programmable Read-Only Memory (EEPROM), or a flash memory component such as a NOR flash memory (NOR flash memory) or a NAND flash memory (NAND flash memory). The application program includes any application installed on the user terminal, including but not limited to a browser, an email, an instant messaging service, word processing, a virtual keyboard, a widget, encryption, digital copyright management, speech recognition, speech reproduction, positioning (such as a function provided by a global positioning system), and music playing.

The communications bus 803 is configured to implement a connection and communication between the processor 801 and the memory 802. The communications bus 803 may be an industry standard architecture (Industry Standard Architecture, ISA) bus, a Peripheral Component Interconnect (PCI) bus, an extended industry standard architecture (Extended Industry Standard Architecture, EISA) bus, or the like. The communications bus 803 may be classified into an address bus, a data bus, a control bus, and the like. For ease of representation, only one bold line is used in FIG. 5 for representation, but it does not indicate that there is only one bus or one type of bus.

The processor 801 is a control center of the electronic device 800, and is connected to various parts of the entire electronic device Boo by using various interfaces and lines, and runs or executes the software program and/or the module stored in the memory 802, and invokes data stored in the memory 802 to perform the following operations: obtaining at least one to-be-processed file in a social circle, where the to-be-processed file is a file uploaded by another user in the social circle other than a user of the electronic device; filtering the at least one to-be-processed file according to a preset rule, to obtain a target file that complies with the preset rule; and saving the target file.

Optionally, the preset rule includes at least one of a preset keyword matching rule, an image matching rule, or a comment keyword matching rule of the user of the electronic device for the to-be-processed file.

Before filtering the at least one to-be-processed file according to the preset rule, the processor 801 further performs the following operation: parsing the at least one to-be-processed file, to obtain a feature library corresponding to each to-be-processed file, where the feature library includes a plurality of elements that are used to represent feature of the to-be-processed file.

That the processor 801 filters the at least one to-be-processed file according to a preset rule includes: filtering, according to the preset rule, the feature library corresponding to each to-be-processed file in the at least one to-be-processed file.

Optionally, if the preset rule includes the preset keyword matching rule, and the preset keyword includes a keyword specified by the user of the electronic device or a default keyword in the electronic device, that the processor 801 filters, according to the preset rule, the feature library corresponding to each to-be-processed file in the at least one to-be-processed file, to obtain a target file that complies with the preset rule includes: performing matching between the preset keyword and the elements in the feature library corresponding to each to-be-processed file in the at least one to-be-processed file, and determining a to-be-processed file corresponding to a matched element as the target file that complies with the preset rule.

Optionally, if the preset rule includes the comment keyword matching rule of the user of the electronic device for the to-be-processed file, that the processor 801 filters, according to the preset rule, the feature library corresponding to each to-be-processed file in the at least one to-be-processed file, to obtain a target file that complies with the preset rule includes: obtaining comment content of the user of the electronic device on the to-be-processed file, and extracting, from the comment content, a target keyword that meets a preset condition; and performing matching between the target keyword and the elements in the feature library corresponding to each to-be-processed file in the at least one to-be-processed file, and determining a to-be-processed file corresponding to a matched element as the target file that complies with the preset rule.

Optionally, before saving the target file, the processor 801 further performs the following operation: determining whether a file that is the same as the target file exists in the electronic device.

That the processor 801 saves the target file includes: if the file that is the same as the target file does not exist in the electronic device, saving the target file to the electronic device.

Optionally, before saving the target file, the processor 801 further performs the following operation: determining whether a file that is the same as the target file exists in a preset cloud.

That the processor 801 saves the target file includes: if the file that is the same as the target file does not exist in the preset cloud, saving the target file to the preset cloud.

In this embodiment of the present invention, the at least one to-be-processed file in the social circle is obtained, and the to-be-processed file is a file uploaded by the another user in the social circle other than the user of the electronic device; the at least one to-be-processed file is filtered according to the preset rule, to obtain the target file that complies with the preset rule; and the target file is saved. In this manner, the at least one to-be-processed file uploaded by the another user can be automatically filtered according to the preset rule, thereby selecting a file that meets a requirement of the user. This saves time for the user, and improves efficiency.

It may be understood that for specific implementations of all the components in the electronic device, further refer to related description in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a Read-Only Memory (ROM), or a Random Access Memory (RAM).

A sequence of the steps of the method in the embodiments of the present invention may be adjusted, and certain steps may also be merged or removed according to an actual need.

Merging, division, and removing may be performed on the modules in the random access apparatus in the embodiments of the present invention according to an actual requirement.

The component such as the microcontroller in the embodiments of the present invention may be implemented by a universal integrated circuit, such as a Central Processing Unit (CPU), or by an application-specific integrated circuit (ASIC).

What are disclosed above are merely specific embodiments of the present invention, and certainly are not intended to limit the protection scope of the present invention. Therefore, equivalent variations made in accordance with the claims of the present invention shall fall within the scope of the present invention.

The invention claimed is:

1. A method, comprising:
   obtaining, by an electronic device, a to-be-processed file shared by a second user, wherein a first user is a user of the electronic device, and the first user and the second user are different users;
   parsing the to-be-processed file, to obtain a feature library corresponding to the to-be-processed file, wherein the feature library comprises a plurality of elements that represent features of the to-be-processed file, and wherein when a plurality of to-be-processed files are shared by one or more users a plurality of feature libraries correspond to the plurality of to-be-processed files, wherein each of the plurality of feature libraries corresponds to one of the plurality of to-be-processed files in a one to one manner, and wherein the one or more users includes the second user;
   filtering, by the electronic device, the feature library corresponding to the to-be-processed file according to a preset rule to obtain a target file that complies with the preset rule, wherein the preset rule is set by the first user for the to-be-processed file, and the preset rule comprises: a preset keyword matching rule, an image matching rule, or a comment keyword matching rule; and
   in response to obtaining the target file that complies with the preset rule, saving, by the electronic device, the target file.

2. The method according to claim 1, wherein the preset rule comprises the preset keyword matching rule, and a preset keyword of the preset keyword matching rule comprises a keyword specified by the first user or a default keyword in the electronic device; and
   wherein filtering, according to the preset rule, the feature library corresponding to the to-be-processed file comprises:
   performing matching between the preset keyword and elements of the plurality of elements comprised in the feature library corresponding to the to-be-processed file, and determining the to-be-processed file is the target file when the preset keyword matches an element of the feature library corresponding to the to-be-processed file.

3. The method according to claim 1, wherein the preset rule comprises the comment keyword matching rule of the first user for the to-be-processed file; and
   wherein filtering, according to the preset rule, the feature library corresponding to the to-be-processed file comprises:
   obtaining comment content of the first user of the electronic device on the to-be-processed file, and extracting, from the comment content, a target keyword that meets a preset condition; and
   performing matching between the target keyword and elements of the plurality of elements in the feature library corresponding to the to-be-processed file, and determining the to-be-processed file is the target file when the target keyword matches an element of the feature library corresponding to the to-be-processed file.

4. The method according to claim 1, wherein before saving the target file, the method further comprises:
   determining whether a file that is the same as the target file exists in the electronic device; and
   wherein in response to obtaining the target file that complies with the preset rule, saving the target file comprises:
   in response to obtaining the target file that complies with the preset rule, and in response to determining that no file that is the same as the target file exists in the electronic device, saving the target file to the electronic device.

5. The method according to claim 1, wherein before saving the target file, the method further comprises:
   determining whether a file that is the same as the target file exists in a preset cloud; and wherein in response to obtaining the target file that complies with the preset rule, saving the target file comprises:
in response to obtaining the target file that complies with the preset rule, and in response to determining that no file that is the same as the target file exists in the preset cloud, saving the target file to the preset cloud.

6. An electronic device, comprising:
a processor;
a non-transitory memory; and
a bus;
wherein the memory is configured to store one or more execution instructions, the processor and the memory are connected using the bus, and when the electronic device runs, the processor executes the one or more execution instructions stored in the memory, causing the electronic device to:
obtain a to-be-processed file, wherein a first user is a user of the electronic device, the to-be-processed file is shared by a second user, and the first user and the second user are different users;
parse the to-be-processed file, to obtain a feature library corresponding to the to-be-processed file, wherein the feature library comprises a plurality of elements that represent features of the to-be-processed file, and wherein when a plurality of to-be-processed files are shared by one or more users a plurality of feature libraries correspond to the plurality of to-be-processed files, wherein each of the plurality of feature libraries corresponds to one of the plurality of to-be-processed files in a one to one manner, and wherein the one or more users includes the second user;
filter the feature library corresponding to the to-be-processed file according to a preset rule to obtain a target file that complies with the preset rule, wherein the preset rule is set by the first user for the to-be-processed file, and the preset rule comprises: a preset keyword matching rule, an image matching rule, or a comment keyword matching rule; and
in response to obtaining the target file that complies with the preset rule, save the target file.

7. The electronic device according to claim 6, wherein the preset rule comprises the preset keyword matching rule, and a preset keyword of the preset keyword matching rule comprises a keyword specified by the first user or a default keyword in the electronic device; and
wherein filtering, according to the preset rule, the feature library corresponding to the to-be-processed file comprises:
performing matching between the preset keyword and elements of the plurality of elements comprised in the feature library corresponding to the to-be-processed file, and determining the to-be-processed file is the target file when the preset keyword matches an element of the feature library corresponding to the to-be-processed file.

8. The electronic device according to claim 6, wherein the preset rule comprises the comment keyword matching rule of the first user for the to-be-processed file; and
wherein filtering, according to the preset rule, the feature library corresponding to the to-be-processed file comprises:
obtaining comment content of the first user of the electronic device on the to-be-processed file, and extracting, from the comment content, a target keyword that meets a preset condition; and
performing matching between the target keyword and elements of the plurality of elements in the feature library corresponding to the to-be-processed file, and determining the to-be-processed file is the target file when the target keyword matches an element of the feature library corresponding to the to-be-processed file.

9. The electronic device according to claim 6, wherein the execution of the execution instruction stored in the memory further causes the electronic device to:
determine whether a file that is the same as the target file exists in the electronic device; and
wherein in response to obtaining the target file that complies with the preset rule, saving the target file comprises:
in response to obtaining the target file that complies with the preset rule, and in response to determining that no file that is the same as the target file exists in the electronic device, saving the target file to the electronic device.

10. The electronic device according to claim 6, wherein the execution of the execution instruction stored in the memory further causes the electronic device to:
determine whether a file that is the same as the target file exists in a preset cloud; and
wherein in response to obtaining the target file that complies with the preset rule, saving the target file comprises:
in response to obtaining the target file that complies with the preset rule, and in response to determining that no file that is the same as the target file exists in the preset cloud, saving the target file to the preset cloud.

11. A non-transitory computer readable storage medium, wherein the non-transitory computer readable storage medium stores a program, and when the program is executed, the following is performed:
obtaining a to-be-processed file, wherein a first user is a user of an electronic device, the to-be-processed file is shared by a second user, and the first user and the second user are different users;
parse the to-be-processed file, to obtain a feature library corresponding to the to-be-processed file, wherein the feature library comprises a plurality of elements that represent features of the to-be-processed file, and wherein when a plurality of to-be-processed files are shared by one or more users a plurality of feature libraries correspond to the plurality of to-be-processed files, wherein each of the plurality of feature libraries corresponds to one of the plurality of to-be-processed files in a one to one manner, and wherein the one or more users includes the second user;
filtering the feature library corresponding to the to-be-processed file according to a preset rule to obtain a target file that complies with the preset rule, wherein the preset rule is set by the first user for the to-be-processed file, and the preset rule comprises: a preset keyword matching rule, an image matching rule, or a comment keyword matching rule; and
in response to obtaining the target file that complies with the preset rule, saving the target file.

12. The non-transitory computer readable storage medium according to claim 11, wherein the preset rule comprises the preset keyword matching rule, and a preset keyword of the preset keyword matching rule comprises a keyword specified by the first user or a default keyword in the electronic device; and wherein filtering, according to the preset rule, the feature library corresponding to the to-be-processed file comprises:
performing matching between the preset keyword and elements of the plurality of elements comprised in the feature library corresponding to the to-be-processed file, and determining the to-be-processed file is the target file when the preset keyword matches an element of the feature library corresponding to the to-be-processed file.

13. The non-transitory computer readable storage medium according to claim 11, wherein the preset rule comprises the comment keyword matching rule of the first user for the to-be-processed file; and
wherein filtering, according to the preset rule, the feature library corresponding to the to-be-processed file comprises:
obtaining comment content of the first user of the electronic device on the to-be-processed file, and extracting, from the comment content, a target keyword that meets a preset condition; and
performing matching between the target keyword and elements of the plurality of elements in the feature library corresponding to the to-be-processed file, and determining the to-be-processed file is the target file when the target keyword matches an element of the feature library corresponding to the to-be-processed file.

* * * * *